United States Patent [19]

Welsch et al.

[11] Patent Number: 5,303,252
[45] Date of Patent: Apr. 12, 1994

[54] GAS LASER

[75] Inventors: Wolfgang Welsch, Baldham; Peter Geschka, Brunnthal; Klemens Huebner, Ottobrunn; Hans Krueger, Munich, all of Fed. Rep. of Germany

[73] Assignee: Siemens Aktiengesellschaft, Munich, Fed. Rep. of Germany

[21] Appl. No.: 910,542

[22] Filed: Jul. 8, 1992

[30] Foreign Application Priority Data

Jul. 12, 1991 [DE] Fed. Rep. of Germany ....... 4123209

[51] Int. Cl.$^5$ ............................................. H01S 3/03
[52] U.S. Cl. ......................................... 372/65; 372/61; 372/92
[58] Field of Search .......................... 372/61, 65, 92

[56] References Cited

U.S. PATENT DOCUMENTS

| 4,081,762 | 3/1978 | Gloser et al. | 372/65 |
| 4,553,240 | 11/1985 | Schmid | 372/61 |
| 4,644,554 | 2/1987 | Sheng | 372/61 |
| 4,823,356 | 4/1989 | Riley | 372/65 |
| 4,866,726 | 9/1989 | Ortiz et al. | 372/65 |
| 4,896,330 | 1/1990 | Krueger et al. | . |
| 5,034,959 | 7/1991 | Welsch | 372/65 |
| 5,097,474 | 3/1992 | Welsch et al. | 372/65 |

Primary Examiner—Leon Scott, Jr.
Attorney, Agent, or Firm—Hill, Steadman & Simpson

[57] ABSTRACT

A gas laser has a capillary which is supported inside a jacket tube by a resilient arrangement, which includes a spring washer having radially extending fingers extending from an annular portion having an axial aperture which is received on a cylindrical portion of a flange ring of the arrangement. The flange ring is soldered to the capillary tube with a glass solder in a manner which prevents the spring washer from coming in contact with the glass solder to change the properties of the spring washer.

16 Claims, 2 Drawing Sheets

GAS LASER

BACKGROUND OF THE INVENTION

The present invention is directed to a gas laser having a jacket tube with a capillary extending coaxially within the jacket tube and being supported within the jacket tube in a radial direction by at least one resilient means, including a spring washer having an axial proximate annular region and resilient fingers extending therefrom in a radial direction, said resilient fingers pressing against the jacket tube and the axially proximate annular region having an axially symmetrical aperture through which the capillary extends, and glass solder being used to secure the resilient means in position on the capillary.

A gas laser having a jacket with a capillary secured at one end in the jacket and extending coaxially therein supported by a spring washer which has an axial aperture receiving the capillary and radially extending fingers is disclosed in U.S. Pat. No. 5,034,959, whose disclosure is incorporated herein by reference thereto and which claims priority from the European Patent Application which was published on Sep. 5, 1990 as European Published Application 0 384 933. The joining of the spring washer to the capillary via a glass solder enables a far-reaching, stress-free support of the capillary. However, in practice, spring properties of the spring washer can be negatively influenced by the presence of the glass solder.

U.S. Pat. No. 4,896,330, whose disclosure is incorporated herein by reference thereto, discloses a support of a capillary with a spring washer that has elastic fingers in the region of the capillary and also in the region of the jacket tube. As a result of the unavoidable manufacturing tolerances, this embodiment does not enable a stress-free bearing of the capillary.

SUMMARY OF THE INVENTION

The object of the present invention is to provide a high and uniform elasticity of the spring, even given small dimensions of the laser and which spring is particularly useful for a helium-neon laser which has a relatively large capillary.

To accomplish these goals, the present invention is directed to an improvement in a gas laser having a jacket tube, a capillary containing a discharge channel extending at least partially in the jacket tube and being supported in the jacket tube in a radial direction by at least one resilient means, said resilient means including a spring washer having an axially proximate annular region and resilient fingers extending therefrom in a radial direction, said resilient fingers pressing against the jacket tube and the axially proximate annular region having an axially symmetrical aperture for receiving the capillary tube and the resilient means being secured in its position relative to the capillary with a glass solder. The improvements are the resilient means including a flange ring having an inside or inner cylinder or cylindrical portion being positioned in the axial aperture of the spring washer, and said flange ring being secured to the capillary with the glass solder.

The division of the resilient means into a flange ring and a spring washer makes it possible that the glass solder attacks only in the region of the stable flange ring. The spring washer is rigidly mechanically joined to the flange ring and shielded from the glass solder, by contrast, will remain elastic over its entire spring area.

In addition to having the inside or inner cylinder, the flange ring advantageously includes a diameter step or radial shoulder and an outside or outer cylinder or cylindrical portion having a larger diameter adjoining this step or shoulder. Thus, the spring washer is secured to the inside cylinder. This fashion of the flange ring forms a space with the capillary that is closed on three sides and in which a soldering with glass solder is possible without having the glass solder penetrate toward the outside. The washer is thereby advantageously crimped onto the inside cylinder or is secured to the step or shoulder with spot welding. In both embodiments, the majority part of the washer is preserved as a spring excursion. The flange ring is advantageously composed of a metal having a coefficient of thermal expansion adapted to the capillary and the spring washer can be fabricated of an optimally matched spring material. Such a spring material need not be adapted to the thermal coefficient of the capillary or of the jacket tube.

Other advantages and features of the invention will be readily apparent from the following description of the preferred embodiments, the drawings and claims.

DESCRIPTION OF THE PREFERRED EMBODIMENTS

Figure 1:
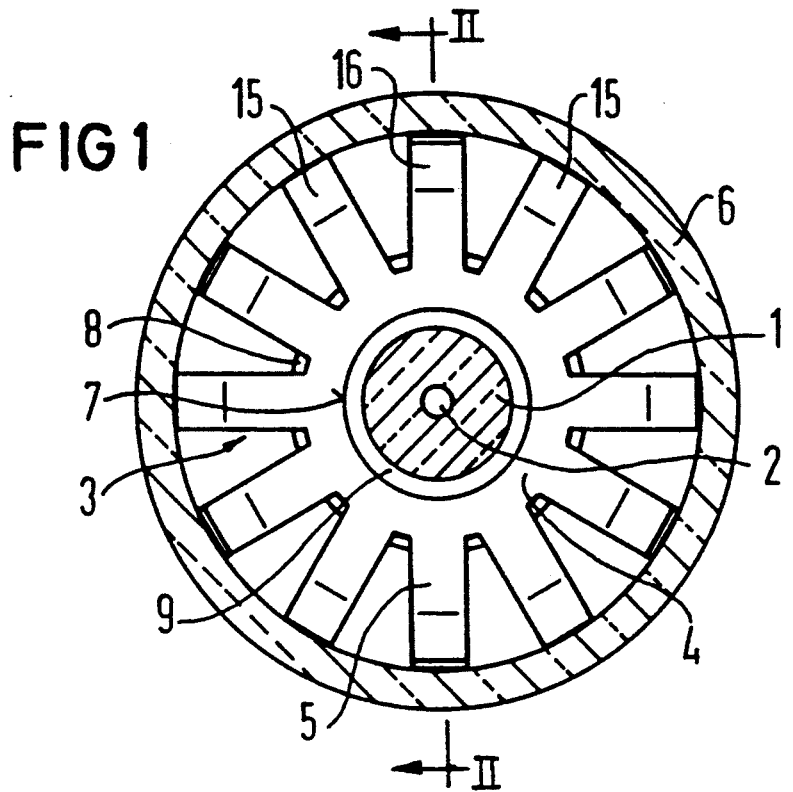
FIG. 1 is a transverse cross sectional view through a laser in accordance with the present invention.
Figure 2:
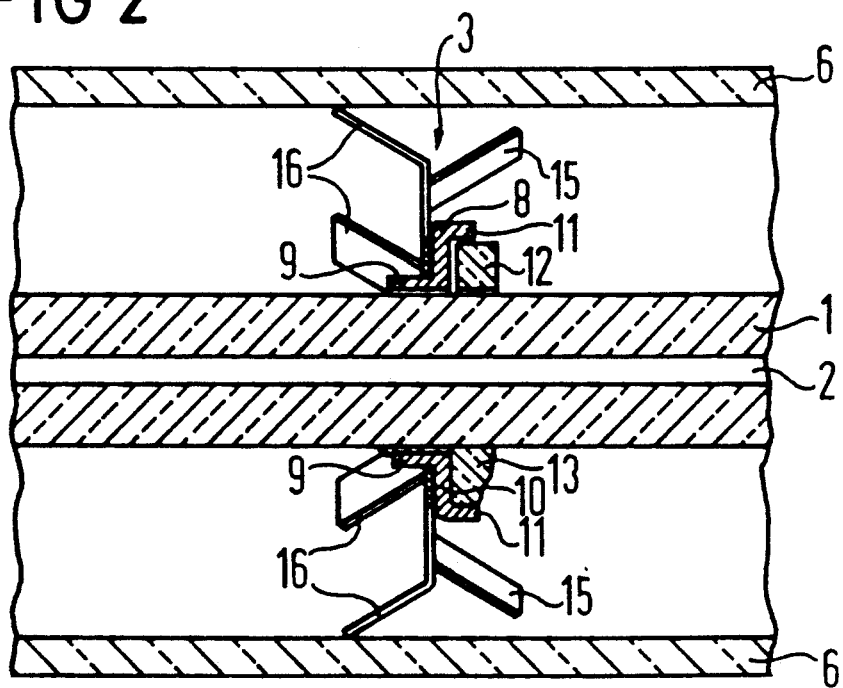
FIG. 2 is a partial longitudinal cross sectional view of the laser taken along the line II—II of FIG. 1.

The principles of the present invention are particularly useful in a gas laser which includes a capillary 1 having a discharge channel 2 and is axially positioned within a jacket tube 6 by a resilient means including a spring washer generally indicated at 3. The spring washer 3 comprises an annular region 4 and radially extending fingers 5. The fingers 5 are bent-off or angled-off into the direction of the capillary axis and, as illustrated in FIG. 2, some of the fingers 5 have bent portions 15 extending in one direction while the other fingers have bent portions 16 extending in the opposite direction, with the portions 15 and 16 being on alternate fingers when viewed in FIG. 1.

The spring washer 3 also has an axial aperture 7 through which an inside cylinder or cylindrical flange 9 of a flange ring 8 projects. The flange ring 8 also includes a diameter step or radial shoulder 10 and an outside or enlarged cylindrical portion 11. A glass solder ring 12, as illustrated in FIG. 2, is arranged in the region of the outside cylinder 11 and the step or shoulder 10 before soldering. As shown in FIG. 2, the ring 11, during soldering, will melt into the shape of the glass solder 13 to penetrate between the capillary 1 and an inner surface of the portion 9 and to join the flange ring 8 to the capillary 1, but does not approach or contact the spring washer 3. The inside cylinder or flange 9 thereby does not lie directly against the capillary, but only via the glass solder 13 so that no pre-stress caused by the dimensioning of the spring ring 3 or, respectively, the tolerances of the overall arrangement can be transmitted onto the capillary 1. Since any undesired curvature of the capillary 1 is thereby avoided, the positional precision and the intensity of the laser beam are enhanced. Since the resilient parts of the spring washer 3, particularly the fingers 5, remain free of glass solder, the elasticity of the spring washer can be fully utilized. A scattering or variation in the pressing power of the spring dependent on the solder process will be avoided. Since no disturbing friction between the parts of the laser to be soldered to one another can arise during assembly until the parts have been slipped into their ultimate position during the soldering process, this is particularly advantageous in a laser formed with glass solder.

Figure 3:
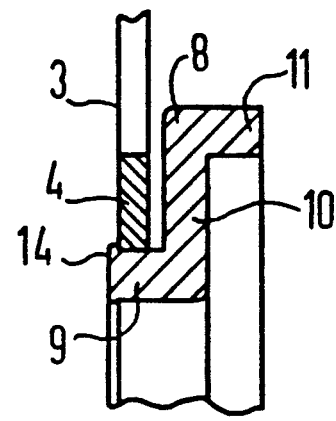
FIG. 3 is a partial cross sectional view illustrating one embodiment for fastening the spring washer on the flange ring.
Figure 4:
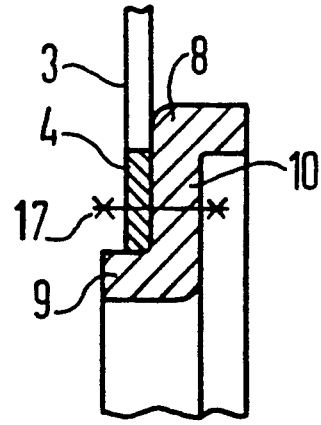
FIG. 4 is a partial cross sectional view illustrating another embodiment for securing the spring washer on the flange ring.

As best illustrated in FIG. 3, the spring washer 3 is held on the inside cylinder 9 of the flange ring 8 with a crimp 14 in the end of the inside cylinder 9. This crimp 14 will fix the annular region 4 of the spring washer 3 and secure the washer 3 on the flange ring 8. An alternative manner of securing the washer 3 onto the flange ring 8 is illustrated in FIG. 4, wherein the annular region 4 of the spring washer is joined to the shoulder or step 10 of the flange ring 8 by one or more spot welds 17.

Although various minor modifications may be suggested by those versed in the art, it should be understood that we wish to embody within the scope of the patent granted hereon all such modifications as reasonably and properly come within the scope of our contribution to the art.

We claim:

1. In a gas laser having a jacket tube and a capillary containing a discharge channel, said capillary being received at least partially in the jacket tube and being supported in the tube in a radial direction with at least one resilient means including a spring washer, said spring washer having an axially proximate annular region with an axially symmetrical aperture for receiving the capillary and resilient fingers extending in a radial direction from said annular region, said resilient fingers pressing against the jacket tube as the resilient means is secured to the capillary, the improvements comprising the resilient means including a flange ring having an inner cylindrical portion, said spring washer having the axially symmetrical aperture received on said inner cylindrical portion and said means for securing including glass solder extending between the flange ring and the capillary.

2. In a gas laser according to claim 1, wherein the flange ring includes a radially extending shoulder and an outside cylindrical portion having a larger diameter than the inner cylindrical portion, and the spring washer being secured to the flange ring.

3. In a gas laser according to claim 2, wherein the spring washer is crimped onto the inner cylindrical portion.

4. In a gas laser according to claim 3, wherein the flange ring is composed of a metal having a coefficient of thermal expansion matched to that of the capillary and the spring washer is composed of a spring material differing therefrom.

5. In a gas laser according to claim 2, wherein the spring washer is secured to the radial shoulder of the flange ring by spot welds.

6. In a gas laser according to claim 5, wherein the flange ring is composed of a metal having a coefficient of thermal expansion matched to the coefficient of thermal expansion of the capillary and the spring washer is composed of a spring material differing therefrom.

7. In a gas laser according to claim 2, wherein the flange ring is composed of a metal having a coefficient of thermal expansion matched to the coefficient of thermal expansion of the capillary and the spring washer is composed of a spring material which is different from the material of the capillary.

8. In a gas laser according to claim 1, wherein the flange ring is composed of a metal having a coefficient of thermal expansion matched to the coefficient of thermal expansion of the capillary and the spring washer is composed of a spring material differing from the material of the capillary.

9. In a gas laser having a jacket tube and a capillary containing a discharge channel, resilient means for supporting said capillary in the jacket tube in a radial direction, said resilient means including a spring washer having an axially proximate annular region with an axially symmetrical aperture for receiving the capillary and resilient fingers extending in a radial direction from said annular region, means for securing the spring washer to the capillary with said resilient fingers pressing against the jacket tube, the improvements comprising the means for securing including glass solder and means for preventing contact of the glass solder with the spring washer, said means for preventing contact including a flange ring having an inner cylindrical portion, said spring washer having said axially symmetrical aperture received on said inner cylindrical portion and said glass solder extending between the flange ring and the capillary.

10. In a gas laser according to claim 9, wherein the flange ring includes a radially extending shoulder and an outside cylindrical portion having a larger diameter than the inner cylindrical portion, and the spring washer being secured to the flange ring.

11. In a gas laser according to claim 10, wherein the spring washer is crimped onto the inner cylindrical portion.

12. In a gas laser according to claim 11, wherein the flange ring is composed of a metal having a coefficient of thermal expansion matched to that of the capillary and the spring washer is composed of a spring material differing therefrom.

13. In a gas laser according to claim 10, wherein the spring washer is secured to the radial shoulder of the flange ring by spot welds.

14. In a gas laser according to claim 13, wherein the flange ring is composed of a metal having a coefficient of thermal expansion matched to the coefficient of thermal expansion of the capillary and the spring washer is composed of a spring material differing therefrom.

15. In a gas laser according to claim 10, wherein the flange ring is composed of a metal having a coefficient of thermal expansion matched to the coefficient of thermal expansion of the capillary and the spring washer is composed of a spring material which is different from the material of the capillary.

16. In a gas laser according to claim 9, wherein the flange ring is composed of a metal having a coefficient of thermal expansion matched to the coefficient of thermal expansion of the capillary and the spring washer is composed of a spring material differing from the material of the capillary.

* * * * *